United States Patent
Nguyen et al.

(10) Patent No.: US 10,475,433 B2
(45) Date of Patent: Nov. 12, 2019

(54) ELECTRICAL POWER GENERATOR WITH ACTIVE NOISE CANCELLATION IN VENTILATION DUCTS

(71) Applicant: General Electric Company, Schenectady, NY (US)

(72) Inventors: Quoc Hoai Nguyen, Houston, TX (US); Arkadiusz Bartlomiej Nagorski, Warsaw (PL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/923,293

(22) Filed: Mar. 16, 2018

(65) Prior Publication Data

US 2018/0301136 A1 Oct. 18, 2018

(30) Foreign Application Priority Data

Apr. 18, 2017 (EP) .................................. 17461525

(51) Int. Cl.
*G10K 11/178* (2006.01)
*F24F 13/24* (2006.01)

(52) U.S. Cl.
CPC ........ *G10K 11/17823* (2018.01); *F24F 13/24* (2013.01); *G10K 11/17825* (2018.01);
(Continued)

(58) Field of Classification Search
CPC ......... H04R 2410/05; G10K 11/17823; G10K 11/178; G10K 11/17825; G10K 11/17881;
(Continued)

(56) References Cited

U.S. PATENT DOCUMENTS 5,010,576 A * 4/1991 Hill ...................... G10K 11/178
381/71.9
5,502,869 A * 4/1996 Smith .................... A47L 9/0081
15/326

(Continued)

FOREIGN PATENT DOCUMENTS

JP    H10-266870 A    10/1998
WO    94/18923 A1    9/1994
(Continued)

OTHER PUBLICATIONS

Extended European Search Report and Opinion issued in connection with corresponding EP Application No. 17461525.2 dated Nov. 24, 2017.

*Primary Examiner* — Ahmad F. Matar
*Assistant Examiner* — Sabrina Diaz
(74) *Attorney, Agent, or Firm* — Dale Davis; Hoffman Warnick LLC

(57) ABSTRACT

A method to suppress noise emanating from an electrical power generator including the steps of: receiving sound emanating from the electrical power generator, wherein the sound is received in a duct for cooling air having passed through the generator; analyzing the received sound and, based on the analysis, generating a sound signal which represents a destructive sound to the received sound, and broadcasting a destructive sound into the duct, wherein the destructive sound corresponds to the sound signal.

15 Claims, 4 Drawing Sheets

(52) U.S. Cl.
CPC .. *G10K 11/17881* (2018.01); *G10K 11/17883*
(2018.01); *F24F 2013/247* (2013.01); *G10K
2210/105* (2013.01); *G10K 2210/112*
(2013.01); *G10K 2210/3011* (2013.01); *G10K
2210/3044* (2013.01)

(58) Field of Classification Search
CPC ............ G10K 11/17883; G10K 11/16; G10K
11/161; G10K 2210/105; G10K 2210/112;
G10K 2210/3011; G10K 2210/3044;
G10K 2210/121; F24F 13/24; F24F
2013/247
USPC .................. 381/1.1, 71.3, 71.5, 71.12, 71.14
See application file for complete search history.

(56) References Cited

U.S. PATENT DOCUMENTS

| | | | | |
|---|---|---|---|---|
| 5,636,286 | A * | 6/1997 | Makabe ............... | G10K 11/178 |
| | | | | 381/71.5 |
| 5,867,748 | A * | 2/1999 | Takahashi ............. | G03G 15/00 |
| | | | | 318/128 |
| 2010/0028134 | A1* | 2/2010 | Slapak ................... | F24F 13/24 |
| | | | | 415/119 |
| 2012/0171947 | A1* | 7/2012 | Takeda ................. | F24F 1/0007 |
| | | | | 454/251 |

FOREIGN PATENT DOCUMENTS

| | | |
|---|---|---|
| WO | 2016/099305 A1 | 6/2016 |
| WO | 2017/183999 A1 | 10/2017 |

\* cited by examiner

ELECTRICAL POWER GENERATOR WITH ACTIVE NOISE CANCELLATION IN VENTILATION DUCTS

BACKGROUND OF THE INVENTION

This invention relates to electrical power generators for power generation plants, and specifically to suppression of noise generated by power generators and emitted by ventilation ducts.

Electrical power generators in power generation plants and other industrial facilities are noisy industrial machines. The generator noise is typically suppressed by sound insulation and baffles mounted to ventilation ducts associated with the generator. The ventilation ducts direct cooling air to and from the generator.

Baffles and insulation in a ventilation duct restrict the flow of the cooling air through the baffles and the generator. Specifically, the baffles and insulation cause a pressure drop in the cooling air flowing through the ducts. This pressure drop can result in a reduction of cooling air passing through and cooling the generator. Moreover, baffles and insulation are most effective at suppressing high frequency noise, such as noise at frequencies above 500 Hertz (Hz), than they are at suppressing low frequency noise.

An approach to reduce low frequency noises is to adjust the design of the rotor in the generator to reduce the amount of noise produced by the generator. However, adjusting the design of the rotor typically requires an expensive redesign and development of the rotor and other moving components in the generator.

In the above described difficulties in suppressing low frequency noise, there is a long-felt need for sound suppression devices for electrical power generators that do not restrict the flow of cooling air and are effective at suppressing noise from the generator, particularly low frequency noise. This need is greatest with respect to noise from large electrical power generators in power generation plants for power utilities and in industrial plants, such as large manufacturing facilities.

BRIEF SUMMARY OF THE INVENTION

The inventors conceived and disclose herein novel systems and methods that apply active noise cancellation (ANC) techniques to suppress noise emanating from an electrical power generator. These novel systems are particularly effective in suppression of low frequency noise, such as at frequencies at or less than 500 Hertz (Hz). These novel systems and methods may be applied in addition or in place of conventional noise suppression systems, such as sound insulation and baffles in the ventilation ducts of the generator.

A novel method has been conceived and is disclosed herein to suppress noise emanating from an electrical power generator including the steps of: receiving sound emanating from the electrical power generator, wherein the sound is received in a duct for cooling air having passed through or being supplied to the generator; analyzing the received sound and, based on the analysis, generating a sound signal which represents a destructive sound to the received sound, and broadcasting a destructive sound into the duct, wherein the destructive sound corresponds to the sound signal.

A method has been conceived and is disclosed here to suppress noise emanating from an electrical power generator comprising: in each of a plurality of cells of a ventilation duct, receiving in a microphone sound emanating from the electrical power generator, wherein the microphone is in the cell and the microphone is positioned near the generator; applying an algorithm to the received sound from the microphone to generate a destructive sound; and in each of the cells, broadcasting the destructive sound into the duct, wherein the destructive sound destructively interferes with the sound emanating from the electrical power generator and propagating through the ventilation duct and the destructive interference reduces a noise level of sound emanating from the cell as compared to a noise level of the sound emanating from the electrical power generator.

A noise suppression system has been conceived and is disclose here that is configured for an industrial electrical power generator, the system comprising: in each of a plurality of cells of a ventilation duct, a microphone is in the cell and positioned near the generator; a speaker in each of the cells; a controller configured, for each cell, to receive a sound signal from the microphone and convert the sound signal to a destructive sound signal by applying an algorithm to the sound signal from the microphone and transmit the destructive signal to the speaker for the corresponding cell, wherein the destructive signal is configured to destructively interfere with sound received by the microphone and propagating through the cell.

DETAILED DESCRIPTION OF THE INVENTION

Figure 1:
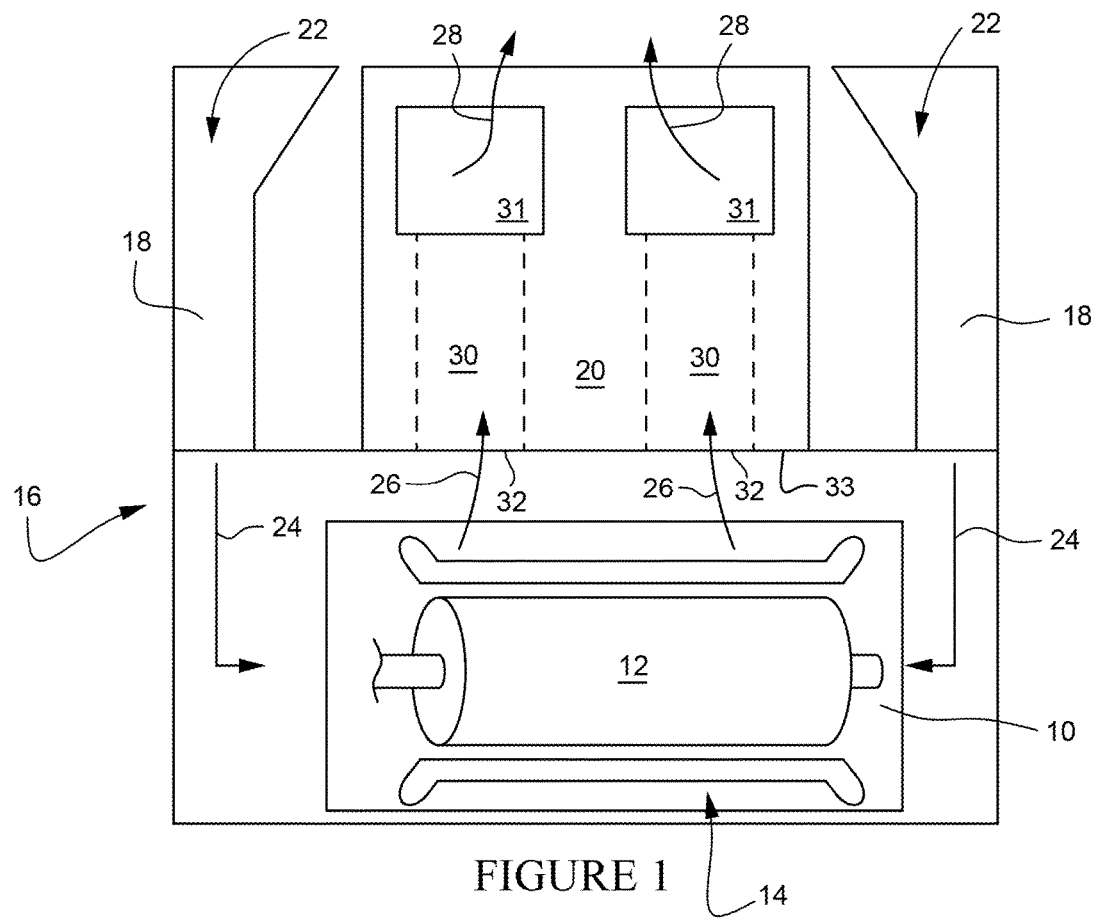
FIG. 1 is a side view of a cross section of a conventional power generator for a power generation plant.

FIG. 1 shows, in cross section, a conventional electrical power generator 10 configured for use in a power generation plant or other industrial facility. The generator generates electricity which is, for example, distributed by the power generation plant via a power grid to customers, such as residences, commercial office buildings and industrial facilities.

The generator 10 includes a rotor 12 and a stator 14, each having electromagnetic or magnetic bars, windings or coils. The rotor 12 is mechanically driven to rotate within the stator. The rotation of the electrically charged conductive bars, windings or coils on the rotor causes electricity to flow through the conductive bars, windings or coils in the stator 14. The electricity from the stator 14 is output from the generator.

The generator 10 is a large turbomachine. The electrical generator may produce power on the order of mega-volt-amps (MVA), such as more than 20 MVA, more than 100 MVA and more than 300 MVA. The generator is housed in an enclosure 16 that includes ducts 18, 20 for cooling air. The mass of the generator and enclosure may be on the order of 100 tons (100 kilonewtons). The dimensions and mass of the generator varies depending on the model and manufacture of the generator.

The enclosure 16 may be a small building, shed or other housing structure. The enclosure 16 may have dimensions of, for example, forty feet (10.2 meters) in each of length, width and height. The walls of the enclosure may have sound insulation panels and baffles to suppress noise from the generator. The housing includes ventilation ducts 18, 20 for cooling air to enter 22 the enclosure, flow 24, 26 through the generator 10 and exhaust 28 from the enclosure.

The ventilation ducts 18, 20 include ventilation intake ducts 18 and a ventilation exhaust ducts 20. The ventilation ducts 18, 20 may be oriented vertically such that cooling air flows vertically through the ducts. The ventilation duct 18, 20 may have other orientations such as horizontal. The ventilation exhaust duct(s) 20 may be above a center section of the generator 10 and between the ventilation intake ducts 18 at opposite ends of the generator. The ventilation exhaust duct 20 may be segmented into cells 30 that are arranged in parallel and extend from the generator to an upper outlet 31. The cells 30 are each a vertically aligned, ventilation duct that directs cooling gas from the generator to an outlet to the atmosphere.

The rotor produces electrical power at certain frequencies such as 50 Hz or 60 Hz, which are based on the nominal rotational speed of the rotor. Noise produced by the generator tends to be particularly high at tonal frequencies which are multiples of the generator rotational speed, such as 50 Hz or 60 Hz. Specifically, low frequency noise tends to be loudest at 100 Hz if the generator outputs 50 Hz electrical power and has a speed of 50 Hz, and at 120 Hz if the generator outputs 60 Hz electrical power and has a speed of 60 Hz.

Figure 2:
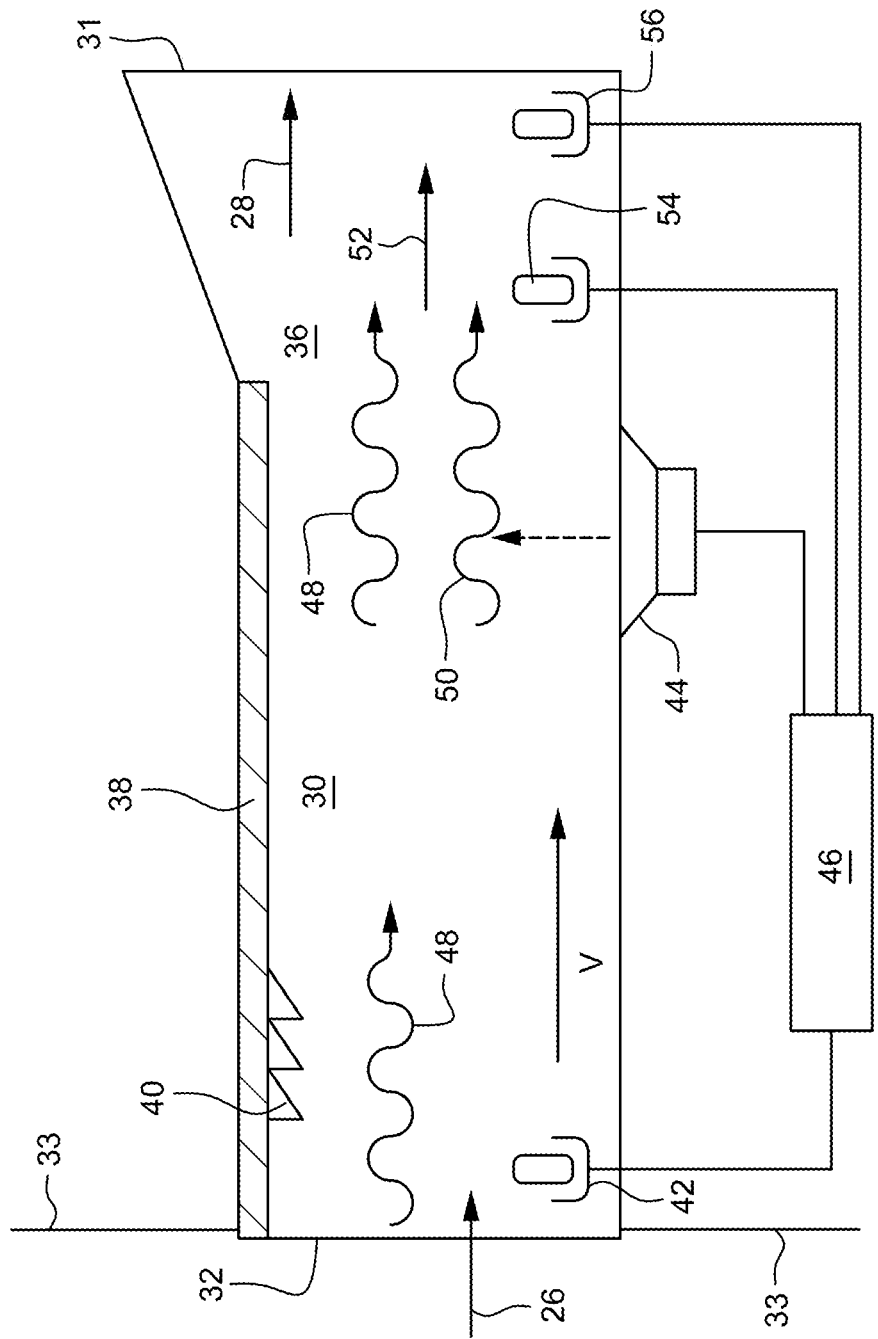
FIG. 2 is a cross section of a ventilation duct.

FIG. 2 is shows a cross section of ventilation exhaust cell 30, wherein the view is along a vertical line (V). The cell 30 may be one of two, four or other number of cells that segment a cross-sectional area of the ventilation exhaust duct 20. Segmenting the ventilation exhaust duct 20 into multiple cells 30 assists in suppressing noise emanating through these ducts. An exemplary cell may have a height of about three feet (one meter), a width of about 5.5 feet (167 cm) and a depth of 2.5 feet (75 cm).

The lower end 32 of the ventilation exhaust cell 30 may be at or near an upper cover 33 (FIG. 1) of the enclosure 16. The lower end 32 may be open to the interior of the enclosure and configured to receive cooling air 26 warmed by the generator and exhaust the air 28 to the atmosphere through upper region 36 (FIG. 2) of the cell 30 and outlet 31 of the cell. The upper region may expand.

The cells 30 may each have sound absorbing walls 38, acoustic baffles 40 and other passive sound suppressing devices. These passive sound suppressing devices may entirely cover the inside surfaces of the cell or may only cover portions of the inside surfaces. Further, some of the passive sound absorbing devices 38, 40 may be on the outer surfaces of the ducts or in the passages defined by the ducts. These passive sound suppressing devices 38 and 40 have been found to be particularly effective at suppressing high frequency noise, e.g., noise at frequencies above 500 Hz.

The inventors realized that these passive sound suppressing devices tend to be less effective at suppressing low frequency noise, such as noise at frequencies less than 500 Hz. The inventors conceived and disclose here an active noise cancellation (ANC) system and method for the ventilation ducts. The ANC system may be positioned in any or all of the ventilation ducts 18, 20, and in each of the cells 30 of a ventilation duct. Further, the ANC system may be tuned to suppress low frequency noise, such as at or below 500 Hz.

The active noise cancellation (ANC) system may include a reference microphone 42, a speaker(s) 44 and a computer controller 46. Sound 48 from the generator tends to emanate from the enclosure 16 through, for example, the ventilation exhaust duct 20 and cells 30. To suppress the generator sound 48, the ANC system is positioned in the ventilation exhaust duct 20 and particularly in the cells 30 of the duct.

The ANC system may be a conventional system adapted for use in a cooling air duct 20 or its cells 30 of an electrical generator. The reference microphone 42 receives the generator sound (noise) 48 passing through the cell 30 in which the reference microphone is positioned. The reference microphone 42 may be positioned at a lower region of the cell 30 near the generator and the upper cover 33, e.g., ceiling, of the enclosure 16 for the generator.

The generator sound 48 received by the reference microphone 42 is analyzed by the controller 46. Based on the analysis, the controller produces a destructive sound signal that destructively interferes with the generator sound 48 propagating through the cell 30. The sound signal is broadcast from the speaker 44 into the cell 30 as a destructive sound 50. As the two sounds 48, 50 combine, the destructive interference character of the destructive sound 50 cancels some of the generator sound 48, especially at low frequencies, to produce a combined sound 52 that emanates from the cell and is quieter than the generator sound.

The combined sound 52 may have a substantially reduced noise level as compared to the noise level of the generator sound 48. The reduction in sound may be 5 to 9 decibels (dB) or more overall, and 7 to 10 dB at certain frequencies, such as the tonal frequencies corresponding to the generator operation.

The controller 46 may apply conventional signal analysis and ANC techniques to generate a destructive sound signal that destructively interferes with the generator sound. The controller 46 may use analog circuits or a digital signal processor to analyze the generator sound 48 and generate the destructive sound signal 50 that corresponds to the generator sound 48. For example, the controller 46 may determine the spectral content of the generator sound 48 in a particular cell 30. The spectral content of the generator sound 48 may include information regarding the amplitude and phase of the generator sound at certain frequencies. For example, the controller 46 may determine the phase and amplitude of the generator sound 48 at tonal frequencies of the generator, such as at a multiple of 50 Hz (such as 100 Hz) for a generator rotating with a speed of 50 Hz or a multiple of 60 Hz (such as 120 Hz) for a generator rotating with a speed of 60 Hz. The controller 46 may generate a destructive sound signal that, for each of the tonal frequencies, has the same amplitude and is 180 degrees out-of-phase as the generator sound.

Figure 3:
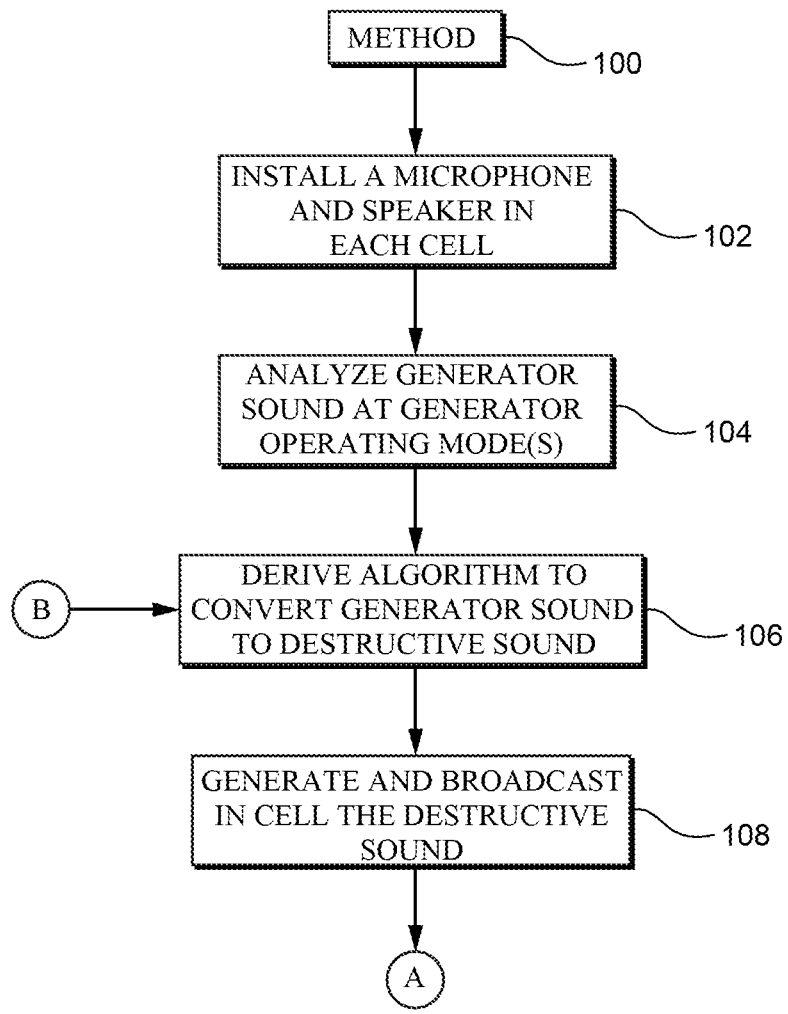
FIGS. 3 and 4 are a flow chart showing a method for tuning an active noise cancellation system in a ventilation duct and suppressing generator noise using the tuned system.
Figure 4:
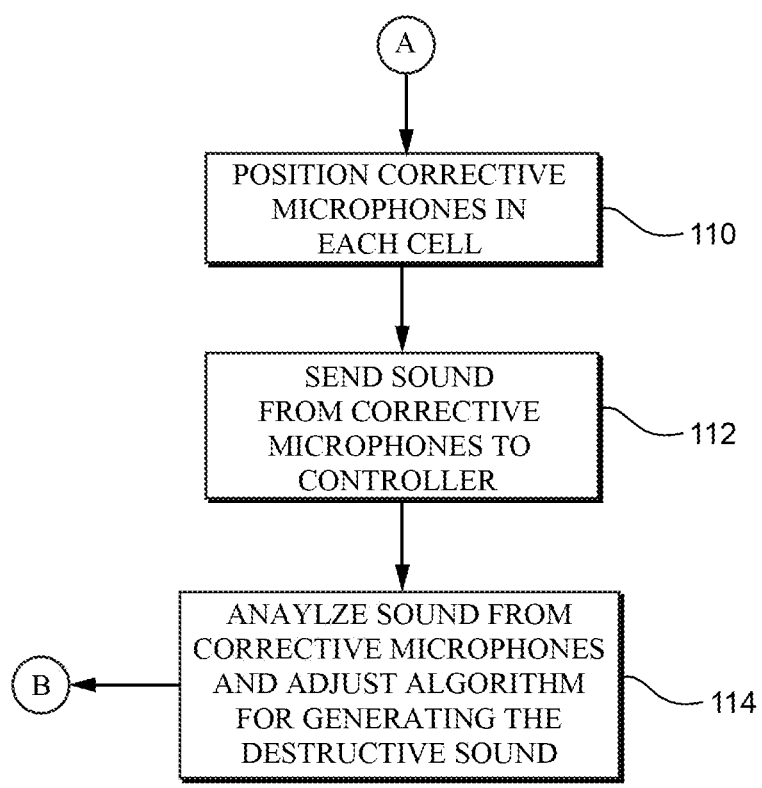

FIGS. 3 and 4 are a flow chart of an exemplary method 100 to setup and tune an active notice cancellation (ANC) system for a generator and to operate the ANC to suppress noise from the generator.

In step 102, a microphone 42 is positioned in a lower section of each cell 30 and a corresponding speaker 44 is positioned in the cell such as above the microphone. Each cell may have a microphone 42 and speaker 44 that are controlled separately from the microphones and speakers in the other cells. This arrangement allows the destructive sound generated in one cell to be tailored specifically to suppress generator noise in that cell. The destructive sound in each of the adjacent cells may be different, albeit slightly. The differences may be due to slight differences in the generator sound in each of the cells. The microphones 42 and speakers 44 in each of the cells may be permanently positioned in their respective cells.

In step 104, the microphone 42 collects the generator sound 48 and sends a correspond signal representing the generator sound to the controller 46 or other computer which analyzes the generator. The generator sound is produced by the signal generator while the generator operates in a standard operating mode, such as a nominal rotational speed of 50 Hz or 60 Hz.

In step 106, the controller or another computer generates an algorithm for converting the generator sound to the destructive sound. The algorithm may be generated using known signal analysis and ANC techniques. The algorithm may be specific to certain low frequencies such as tonal frequencies corresponding to multiples of the rotation speed of the rotor, e.g., nominally at 50 Hz or 60 Hz. The algorithm may generate a signal for the destructive sound by modifying the generator sound such that, at certain frequencies, the generator sound is shifted, e.g., delayed or advanced, by 180 degrees.

Further the algorithm may adapt in real time to fluctuations in the rotor speed, such as the speed varies slightly from 50 Hz or 60 Hz depending on the load on the generator and the rotational speed of the turbine driving the generator. As fluctuations are detected in the rotor speed or in the tonal frequency(ies) of the noise from the generator, the algorithm may shift the frequencies of the destructive sound in a manner corresponding to the fluctuations of the rotor speed or tonal frequency(ies).

In step 108, the controller 46 applies the algorithm to the generator sound 48 as received by the microphone 42. By applying the algorithm, the controller converts the generator sound to the destructive sound 50 and the speaker 44 broadcasts the destructive sound into the cell. The controller converts the generator sound, generates the destructive sound signal and broadcasts the destructive sound signal in real time as the generator sound 48 propagates through the cell 30.

Steps 110 to 114, the algorithm is corrected or adjusted. In step 110, correction microphones 54, 56 are positioned, at least temporarily, in each cell near the outlet 31 or upper end 36 of the cell. The correction microphones 54, 56 (which may be more than two microphones) are positioned at or across the area within the cell. The correction microphones are positioned to collect an accurate representation of the noise emanating from the cell.

The correction microphones are used to adjust the algorithm used by the controller to generate the destructive sound. The microphones 54, 56 may be used only during setup of the ANC system and thus may be temporarily positioned in the cells.

In step 112, the combined sound 52 in a cell is received by correction microphones 54, 56. The sound received by the microphones 54, 56 is used for error correction of the algorithm used to generate the destructive sound signal.

In step 114, the combined sound 52 received by the microphones 54, 56 is analyzed such as by determining the amplitudes and phases of the sound at the frequencies, e.g., tonal frequencies, used to generate the destructive sound 50. The amplitude or phase of a particular frequency of the destructive sound 50 may be adjusted to reduce the amplitude of the combined sound 52 at the same frequency. The analysis and development of the error correction to the algorithm may be performed by the controller 46 or by another computer used to setup or tune an algorithm, e.g., transfer function, used by the controller 46 to generate the sound signal for the destructive sound 50.

Once the error correction steps 110 to 114 are completed, the algorithm with any corrections is set in the controller 46 and used to generate, in real time, the destructive sound 50 from the generator sound 48. In this configuration, the ANC system is a feed-forward control system.

The embodiment disclosed here has a single reference microphone 42 and a single speaker 44. In this configuration, the ANC system is a single input reference microphone and single output speaker (SISO) system. Another embodiment has multiple reference microphones 42 and multiple speakers 44 and is a Multiple Input Multiple Output (MIMO) system. Thus, the invention may be embodied as a SISO or MIMO system.

Any ANC method with associated hardware such as a microphone and speaker may be used to generate destructive superposition of sounds for purposes of reducing sounds emanating from a generator. The ANC method and system may incorporate either or both feedback and feed-forward ANC techniques depending on characteristics of the source of the generator sound and constraints of the application of the ANC system and method.

Technical advantages provided by the ANC systems disclosed herein include simple installation and setup with minimal changes to the generator and the ventilation duct or its cells; negligible pressure loss in the duct or its cells due to the ANC system; an error correction feature that allows the algorithm to be tuned to maximum suppression of generator noise, including low frequencies such as below 500 Hz, 200 Hz, and 100 Hz.

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention is:

1. A method to suppress noise emanating from an electrical power generator, comprising:

rotating a rotor of the generator at a rotational speed to generate electrical power with a frequency equal to the rotational speed of the rotor;

receiving sound emanating from the electrical power generator, wherein the sound is received at a first place in a duct for cooling air having passed through the generator;

analyzing the received sound and, based on the analysis, generating a destructive sound signal corresponding to the received sound, the analyzing including determining the rotational speed of the rotor of the generator and determining a phase and amplitude of the sound emanating from the generator at tonal frequencies corresponding to multiples of the rotational speed of the rotor of the generator;

broadcasting the destructive sound signal into the duct;

receiving sound at a second place in the duct downstream in a direction of the cooling air, and applying the sound received at the second place to adjust the destructive sound signal;

determining fluctuations in the rotational speed of the rotor of the generator due to load changes on the generator and changes to a rotational speed of a turbine driving the generator; and adjusting the destructive sound signal based on the fluctuations in the rotational speed of the rotor of the generator.

2. The method of claim 1 wherein the generated destructive sound signal has an amplitude at the tonal frequency that is substantially the same as the amplitude of the received sound at the tonal frequency and the destructive sound signal at the tonal frequency is substantially 180 degrees out of phase with the phase of the received sound at the tonal frequency.

3. The method of claim 2 wherein the tonal frequency is at least one multiple of 50 Hz while the rotor of the generator is rotating at a speed of 50 Hz, or is at least one multiple of 60 Hz while the rotor of the generator is rotating at a speed of 60 Hz.

4. The method of claim 1 wherein the broadcasting the destructive sound signal results in a combined sound in the duct having a noise level less than the sound emanating from the electrical power generator.

5. The method of claim 4 wherein the noise level is at least 3 decibels below the sound emanating from the electrical power generator for a certain frequency below 500 Hz.

6. A method to suppress noise emanating from an electrical power generator, comprising:
rotating a rotor of the generator at a rotational speed to generate electrical power with a frequency equal to the rotational speed of the rotor;
in each of a plurality of cells of a ventilation duct of the generator:
receiving in a microphone sound emanating from the generator, wherein the microphone is at a first place in the cell and near the generator;
analyzing the received sound and, based on the analysis, generating a destructive sound signal corresponding to the received sound, the analyzing including monitoring the rotational speed of the rotor of the generator and determining a phase and amplitude of the sound emanating from the generator at tonal frequencies corresponding to multiples of the monitored rotational speed of the rotor of the generator; and
broadcasting the destructive sound signal into the cell of the duct, wherein the destructive sound signal destructively interferes with the sound emanating from the generator and propagating through the ventilation duct, the destructive interference reducing a noise level of sound emanating from the cell as compared to a noise level of the sound emanating from the generator;
determining fluctuations in the rotational speed of the rotor of the generator due to load changes on the generator and changes to a rotational speed of a turbine driving the generator; and
adjusting the destructive sound signal based on the fluctuations in the rotational speed of the rotor of the generator.

7. The method of claim 6 wherein the destructive sound signal has an amplitude at the tonal frequency which is substantially the same as an amplitude of the sound in the cell emanating from the generator at the tonal frequency and the destructive sound signal is substantially 180 degrees out of phase with a phase of the sound in the cell and emanating from the generator at the tonal frequency.

8. The method of claim 6 wherein the tonal frequency is at least one multiple of 50 Hz while the rotor of the generator is rotating at a speed of 50 Hz, or is at least one multiple of 60 Hz while the rotor of the generator is rotating at a speed of 60 Hz.

9. The method of claim 6 further comprising, in each of the cells, receiving sound at a second place in the cell downstream in a direction of cooling air in the cell and applying the sound received at the second place to adjust the destructive sound signal.

10. The method of claim 6 wherein the broadcasting of the destructive sound signal results in a combined sound in the duct having a noise level at least 3 decibels below the sound emanating from the electrical power generator for a certain frequency below 500 Hz.

11. A noise suppression system configured for an industrial electrical power generator, the system comprising:
a microphone and a speaker in each of a plurality of cells of a ventilation duct, the microphone positioned near the generator and configured to receive a sound signal emanating from the generator as a rotor of the generator rotates at a rotational speed to generate electrical power with a frequency equal to the rotational speed of the rotor and passing through the cell;
a controller configured, for each cell, to analyze the received sound signal and generate a destructive sound signal corresponding to the received sound signal based on the rotational speed of the rotor of the generator, the controller determining a phase and amplitude of the received sound signal at tonal frequencies of the generator corresponding to multiples of the rotational speed of the rotor of the generator;
wherein, in each cell, the destructive sound signal is broadcast into the cell by the speaker, the destructive sound signal destructively interfering with and reducing a noise level of the sound signal emanating from the generator and passing through the cell;
the controller further configured to:
determine fluctuations in the rotational speed of the rotor of the generator due to load changes on the generator and changes to a rotational speed of a turbine driving the generator; and
adjust the destructive sound signal broadcast in each cell based on the fluctuations in the rotational speed of the rotor of the generator.

12. The noise suppression system of claim 11 wherein the destructive sound signal in each cell has an amplitude at a tonal frequency which is substantially the same as an amplitude of the sound in the cell emanating from the generator at the tonal frequency and is substantially 180 degrees out of phase with a phase of the sound in the cell and emanating from the generator at the tonal frequency.

13. The noise suppression system of claim 12 wherein the tonal frequency is at least one multiple of 50 Hz while the rotor of the generator is rotating at a speed of 50 Hz, or at least one multiple of 60 Hz while the rotor of the generator is rotating at a speed of 60 Hz.

14. The noise suppression system of claim 11 further comprising, in each of the cells, at least one error correction microphone configured to receive sound from the cell downstream in a direction of cooling air in the cell.

15. The noise suppression system of claim 14, wherein the at least one error correction microphone is used only during a setup of the system.

* * * * *